July 8, 1969            D. P. ZAFIROGLU          3,454,443
FORMING A SUBSTANTIALLY RIGID ARTICLE HAVING A THERMOPLASTIC
MATERIAL AS AT LEAST ONE EXPOSED SURFACE
Filed Sept. 20, 1965

INVENTOR
DIMITRI P. ZAFIROGLU

BY *Herbert M. Wolfson*

ATTORNEY

United States Patent Office 3,454,443
Patented July 8, 1969

3,454,443
FORMING A SUBSTANTIALLY RIGID ARTICLE HAVING A THERMOPLASTIC MATERIAL AS AT LEAST ONE EXPOSED SURFACE
Dimitri P. Zafiroglu, Wilmington, Del., assignor to E. I. du Pont de Nemours and Company, Wilmington, Del., a corporation of Delaware
Filed Sept. 20, 1965, Ser. No. 488,581
Int. Cl. B29c 27/20
U.S. Cl. 156—287      16 Claims

ABSTRACT OF THE DISCLOSURE

A substantially non-deformable cylinder, having a thermoplastic material, e.g., the copolymer of tetrafluoroethylene and hexafluoropropylene, as its interior and/or exterior surface, is formed by utilizing a relatively rigid material adhereable to the thermoplastic material and either a mandrel or a sleeve whose heat expansion characteristics are different from those of the relatively rigid material. By placing the thermoplastic material between the mandrel or sleeve and the relatively rigid material and then heating to soften the thermoplastic material, the thermoplastic material is made to adhere to the surface of the relatively rigid material.

---

Figure 1:
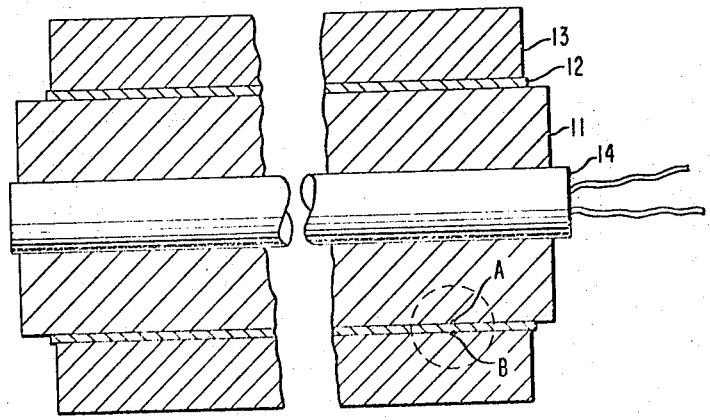

This invention relates to a novel method of bonding thermoplastic materials to other materials which may or may not be thermoplastic. More particularly, the invention relates to the method of bonding thermoplastic materials to substantially cylindrical articles.

The invention will be described primarily for the lining of substantially non-deformable polytetrafluoroethylene cylinders with a film of the copolymer of tetrafluoroethylene and hexafluoropropylene. However, the invention is not so limited but is applicable wherever it is desired to adhere a pliable thermoplastic material to a substantially cylindrical article.

The problems involved in lining cylinders are well known. Enamel spraying and fluidized-bed coating, the general commercial techniques for inside lining, are far from fool-proof. Continuous linings, free of pinholes, are more the exception than the rule. Such spraying and coating becomes even more difficult with chemically-resistant materials for which solvents or dispersing agents are difficult to locate.

It is an object of the present invention to provide a process for lining cylinders with thermoplastic materials. It is a further object to provide a process that will have general utility in the field of bonding thermoplastic materials to articles maintained in a substantially rigid condition. It is a still further object to adhere copolymers of tetrafluoroethylene and hexafluoropropylene to such materials as polytetrafluoroethylene, aluminum, steel, bronze, etc. It is a still further object to encapsulate perforated non-deformable articles such as perforated metals or metal screening with thermoplastic materials. Other objects will appear hereinafter.

The objects are accomplished by placing at least one layer of a thermoplastic material over the curved surface of a substantially cylindrical mandrel, for example, by wrapping the mandrel with the thermoplastic material, the inner layer of the thermoplastic material and the outer surface of the mandrel not being adhereable to each other under the conditions of the process; placing the thus covered mandrel within a cylinder of material maintained in a substantially non-deformable, rigid condition in snug contact therewith, the interior surface of the cylinder and the outer layer of the thermoplastic material being adhereable at the softening temperature (usually the melting point) of the outer layer of the thermoplastic material; and heating the mandrel at a rate such that: (1) the temperature at the interface of the thermoplastic material and the cylinder rises to a temperature above the softening temperature of the thermoplastic material but below the degradation temperature of the thermoplastic material, and (2) at such time, the temperature of the mandrel and the temperature of the cylinder are such that the mandrel has expanded more than the cylinder; maintaining these conditions for a period sufficient to adhere the materials at the interface, usually at least 10 seconds, and, thereafter, cooling the materials whereby at least the outer layer of the thermoplastic material is bonded to the interior surface of the cylinder.

The lining of a cylindrical sleeve of polytetrafluoroethylene with at least one layer of the copolymer of tetrafluoroethylene and hexafluoropropylene illustrates one of the important applications of this invention. In this situation, a mandrel having a high thermal conductivity is used. Thus, a metal mandrel, e.g., of aluminum, brass, stainless steel or the like, is preferred. In operation, the mandrel is fitted with a cartridge heater and wrapped with at least one layer of the copolymer film. The wrapped mandrel is then placed snugly within the polytetrafluoroethylene sleeve. Since the coefficient of expansion of the metal mandrel is less than the coefficient of expansion of the polytetrafluoroethylene sleeve, it is necessary that the rate of heating of the mandrel is sufficiently rapid so that the polytetrafluoroethylene sleeve is kept at a temperature below that of the mandrel. Only in this way can the expansion of the mandrel be greater than the expansion of the sleeve. Furthermore, this rate of heating must be sufficient to raise the temperature of the outer layer of the film of the copolymer of tetrafluoroethylene and hexafluoropropylene above its melting point so that the pressure generated by the differential expansion of the mandrel and the sleeve can serve to bond the softened copolymeric layer to the interior surface of the polytetrafluoroethylene sleeve. Thereafter, the composite is cooled rapidly to provide the lined cylindrical sleeve. Such a process can be used to line sleeves with thermoplastic materials so long as the temperature at which bonding will occur is above the softening temperature of the thermoplastic material but below its degradation temperature.

It should be pointed out that where the cylindrical sleeve is thin, ⅛ inch or less, it is advantageous to employ an outer rigid retaining ring which is usually made of metal. Such a situation would also prevail where the "cylindrical sleeve" is a thin adherent coating on the interior surface of the external ring so that, in reality, a lined metal cylinder is produced. In this latter situation, the liner material is usually the same as the thin adherent coating material so that both materials tend to soften and fuse together.

The system wherein the "liner" material and the "sleeve" material are the same thermoplastic material can be used to encapsulate a perforated sleeve or screen of a nondeformable material, e.g., stainless steel or aluminum. In operation, the perforated sleeve is placed between layers of the thermoplastic material and the composite is placed over a mandrel having a non-adhereable external surface and within an outer retaining ring having a non-adhereable internal surface. The process of heating to obtain differential expansion (the expansion of the mandrel being greater than that of the sleeve) and softening of the thermoplastic is the same as that previously described.

The system where the "liner" material and the "sleeve" material are both thermoplastic and thin can also be used in the described process to provide laminates of the two materials. The hollow cylinder which is obtained can be slit and opened to be used as laminated sheet material and the mandrel diameter can be large or small depending on the laminate size desired. A metal screen or foil or a plastic net could be inserted between the film layers to provide a reinforced laminate.

It should also be understood that the process can be used to adhere a thermoplastic material onto the outer surface of a receptive cylindrical article. In this process, the mandrel becomes the adhereable article maintained in substantially rigid condition while the outer retaining ring is used as an inert sleeve in order to obtain the differential expansion between mandrel and sleeve when heat is applied.

Figure 2:
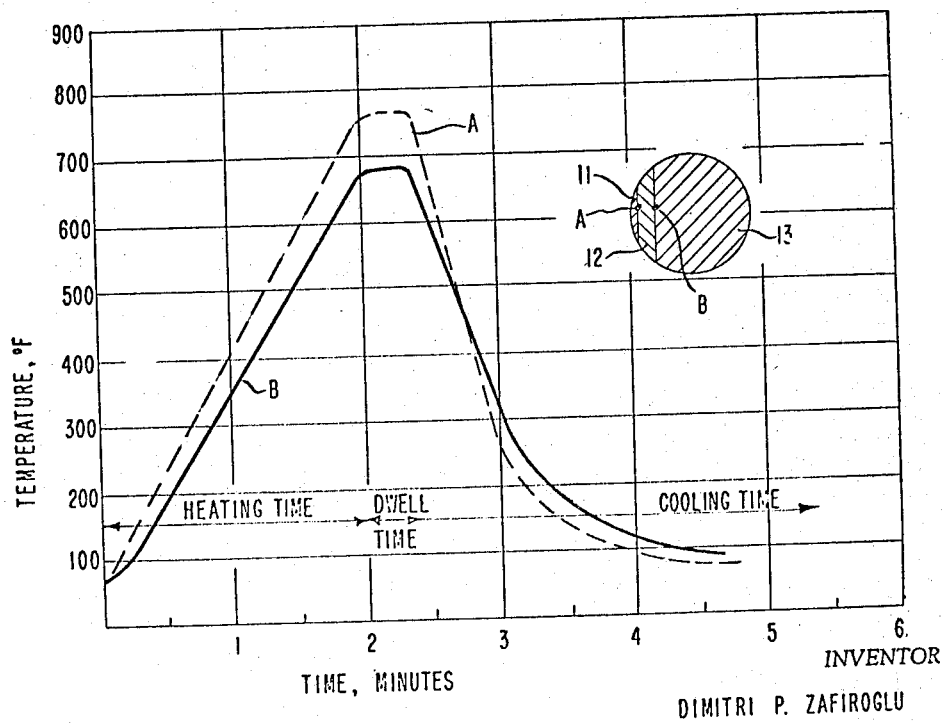

The invention will be more clearly understood by referring to the drawing and the examples which follow. In the drawing, FIGURE 1 is a sectional view of one embodiment that employs the process of the invention; and FIGURE 2 is a typical cycle for lining a polytetrafluoroethylene sleeve with a copolymer of tetrafluoroethylene and hexafluoropropylene.

EXAMPLES 1–7

An aluminum mandrel 11 onto which three layers of a 5 mil "Teflon" FEP [1] fluorocarbon film 12 (total thickness of 0.015 inch) has been wound is inserted into a cylindrical sleeve 13 of "Teflon" TFE [2] fluorocarbon approximately 2 inches in inside diameter and having a ¼-inch wall thickness. The clearance between the rigid mandrel and the polytetrafluoroethylene sleeve is slightly less than the differential expansion to be developed subsequently. A cartridge heater 14 is placed in the central opening of the aluminum mandrel to provide the composite shown in FIGURE 1.

Current applied to the cartridge heater serves to raise the temperature of the mandrel. The temperature development at the two important interfaces, the interface A between the mandrel and the inner layer of the copolymeric film and the interface B between the outer layer of the copolymeric film and the interior surface of the sleeve, is shown in FIGURE 2. Specifically, the temperature at the interface of the outer film layer and the interior surface of the sleeve reaches about 690° F. and the temperature of the other interface reaches about 735° F. within about 3 minutes. The degradation temperature of the copolymer is 760° F. At these conditions, the mandrel and the film layers thereon expanded about 17 mils while the polytetrafluoroethylene sleeve expands only 7 mils. The system is maintained at these conditions for about 25 seconds. Thereafter, the heater is removed from the mandrel and the assembly is chilled quickly by dipping it into cold water. After the mandrel is extracted, it is found that the film liner composed of the terfluoroethylene and hexafluoropropylene copolymer is bonded tightly to the interior surface of the polytetrafluoroethylene sleeve.

In an optional step, the lined sleeve may be subjected to a glazing cycle. This cycle serves to clean the liner surface and to improve the bonds that are obtained between the liner and the sleeve. Glazing may be accomplished by inserting the lined sleeve into a uniform temperature hot air oven at 625° F. for a period of about 4 hours. After this period, the oven temperature is lowered to 575° F. where it is kept for a period of 36 hours. Thereafter, the oven is cooled to room temperature within about 6 hours. As mentioned previously, this cycle serves to improve the adhesive bonds and to clean the surface by burning away all residues and dirt therefrom.

In Examples 2–7, the general procedure of Example 1 is repeated except that the mandrel diameter, thermoplastic material thickness, outer sleeve wall thickness, wrapped mandrel to outer sleeve clearance and heating rate are so regulated to obtain the ranges of interface temperatures ($T_1$), dwell times (R), and pressures at the interface of the outer layer of the liner and the interior surface of the sleeve (P), useful in obtaining acceptable seal strengths (F) listed below. In all these examples, the seal strengths after the glazing step ($F_g$) is also obtained. The results for the seven examples are presented in Table I.

TABLE I

| Example | $T_i$ (° F.) | R (seconds) | P (p.s.i.) | F (lb./in.) | $F_g$ (lb./in.) |
|---|---|---|---|---|---|
| 1 | 690 | 25 | 20 | 3–6 | 10–15 |
| 2 | 700 | 25 | 2 | 8–10 | 15–20 |
| 3 | 700 | 120 | 2 | 15–20 | 25–30 |
| 4 | 710 | 60 | 50 | 10–15 | |
| 5 | 710 | 120 | 2 | 18–20 | 25–30 |
| 6 | 710 | 120 | 50 | 18–20 | 25–40 |
| 7 | 730 | 120 | 50 | 10–15 | 25–35 |

EXAMPLES 8 AND 9

In Example 8, the procedure of Example 1 was followed substantially using a ⅛-inch thick polytetrafluoroethylene cylinder. Three layers of the 5-mil thick film of the tetrafluoroethylene hexafluoropropylene copolymer and an aluminum mandrel were used. After a heat-up time of only 1 minute, the temperature of the interface between the outer layer of the copolymeric film and the interior surface of the polytetrafluoroethylene cylinder is 710° F. The pressure developed at the interface is 50 p.s.i. After maintaining these conditions for 60 seconds, and subsequently cooling the composite, a lined polytetrafluoroethylene cylinder is obtained. The seal strength at the interface is 10–15 lb./in. However, it is noted that the film of the tetrafluoroethylene-hexafluoropropylene copolymer has been somewhat degraded indicating that the cycle has probably been too rapid.

In a control, a heat-up time of 10 minutes is used to bring the temperature of the interface between the outer layer of the liner and the interior surface of the cylinder to 710° F. However, this slow cycle permits the relatively thin outer sleeve to heat up and expand more than the mandrel. Consequently, pressure is lost and no bond is made. It is concluded that for this wall thickness of ⅛ inch, the heat-up time should be close to 1 minute to produce a bond. However, as shown previously, this is impractical since degradation is induced.

In Example 9, a stainless steel retaining ring is placed over the ⅛-inch thick polytetrafluoroethylene cylinder. In all other respects, the conditions are the same as the above-recited control. A heat-up time of 10 minutes is used to bring the temperature at the interface between the outer layer of the copolymeric film liner and the interior surface of the polytetrafluoroethylene cylinder to 710° F. The conditions are maintained for 120 seconds and the pressure developed is 50 p.s.i. After quenching, the copolymer film is bonded securely to the interior surface of the polytetrafluoroethylene cylinder, the seal strength at the interface being 10–15 lb./in. Hence, it is concluded that a retaining ring makes the system less sensitive to the heating cycle.

EXAMPLE 10

The general procedure of Example 1 is repeated using a stainless steel sleeve whose interior surface has been precoated with a thin coating of a copolymer of tetrafluoroethylene and hexafluoropropylene using conventional spraying and baking techniques. An aluminum mandrel wrapped with 3 layers of a 5-mil film of the copolymer of tetrafluoroethylene and hexafluoropropylene is placed within the sleeve. The interface between the film coating and the outer layer of the copolymeric film wrap is heated to 560° F. where it is maintained for a period of 60 seconds. The differential expansion between the aluminum mandrel and the stainless steel sleeve causes a pressure of 1–2 p.s.i. After cooling, the copolymeric film

---

[1] Du Pont's registered trademark for the copolymer of tetrafluoroethylene and hexafluoropropylene.
[2] Du Pont's registered trademark for polytetrafluoroethylene.

is bonded securely to the coating on the stainless steel sleeve.

Since stainless steel expands less than aluminum at 560° F., it is possible to run this process without the interior cartridge heater. Instead, the composite may be placed in an oven at a temperature of 560° F. to provide substantially the same result. It is also possible to use a polytetrafluoroethylene mandrel instead of aluminum and heat the composite externally as in a furnace. Although, in this latter situation the mandrel may heat less than the outer stainless steel sleeve, the mandrel expands more than the sleeve to provide the desired pressure.

EXAMPLES 11–17

In these examples, the optimum conditions for sealing layers of the same thermoplastic material, the tetrafluoroethylene-hexafluoropropylene copolymer, to each other are determined. The degradation temperature of this copolymer is 760° F. Its softening temperature range begins at about 500° F.

A layer of the copolymer is wound on a polytetrafluoroethylene mandrel, the mandrel having been treated to prevent adherence. A second layer of the copolymer is wrapped around the first layer and the composite is inserted into a stainless steel ring or sleeve. The sleeve is adapted to be heated.

The sleeve is heated in a manner to bring the temperature of the interface between the layers to 510–560° F. as shown in Table II below. Pressure of 2–15 p.s.i. and dwell times (R) of 10–30 seconds are employed. The seal strengths (F) obtained are satisfactory.

TABLE II

| Example | $T_i$ (° F.) | R (seconds) | P (p.s.i.) | F (lb./in.) |
|---|---|---|---|---|
| 11 | 510 | 10 | 2 | 20 |
| 12 | 510 | 10 | 15 | 25 |
| 13 | 530 | 10 | 2 | 30 |
| 14 | 530 | 30 | 2 | 40 |
| 15 | 540 | 10 | 2 | 50 |
| 16 | 540 | 30 | 2 | 50+ |
| 17 | 560 | 30 | 2 | 50+ |

It is found that at higher temperature-pressure-dwell time combinations, excessive deformation occurs.

EXAMPLES 18 AND 19

Example 17 is repeated substantially after placing a cylindrical aluminum screen between the layers of the copolymer film in Example 18 and a perforated stainless sleeve between the layers in Example 19. Dwell times of about 240 seconds are used. The results are essentially the same as those in Example 17, the seal strength being greater than 40 lb./in.

This process is also operable by inserting the composite into an oven maintained at about 560° F. instead of heating the outer ring.

EXAMPLE 20

Two layers of a 5-mil thick film of tetrafluoroethylene-hexafluoropropylene copolymer are wound on a polytetrafluoroethylene mandrel. The composite is inserted into a stainless steel sleeve adapted for heating. By heating the sleeve slowly to about 700° F., the polytetrafluoroethylene mandrel is found to reach about 350° F. at its internal surface and 700° F. at its external surface causing an expansion of about 2% compared to an expansion of the sleeve of only about 1%. A heat-up time of 3 minutes and a dwell time of 120 seconds are employed. The pressure developed is 50 p.s.i. After cooling, it is found that the copolymer film is adhered firmly to the outer surface of the polytetrafluoroethylene mandrel, the seal strength being 10–15 lb./in.

EXAMPLES 21 AND 22

In Example 21, a 20-mil film of branched polyethylene is wrapped onto a non-adherable polytetrafluoroethylene cylinder. A 1-mil thick polyvinyl fluoride film that has been flame treated to improve its adhereability is wound over the polyethylene film and the composite is inserted into a stainless steel sleeve. Heating is accomplished in a manner to bring the interface of the two films to a temperature of about 450° F. where it is held for about 5 minutes. The degradation temperature of the polyvinyl fluoride is 550° F. After cooling, the films bonded to each other in the form of a tube are removed. The tube is slit to provide a laminate especially suited to thermoforming.

In Example 22, the films are reversed, the polyvinyl fluoride film being wrapped on the polytetrafluoroethylene mandrel and the branched polyethylene film being wrapped over the polyvinyl fluoride film. The composite is inserted into the stainless steel sleeve. The interface between the two films is heated to 450° F. where it is held for more than 120 seconds developing a pressure greater than 2 p.s.i. After cooling and slitting, it is found that the seal strength is greater than 20 lb./in.

EXAMPLE 23

A 2-mil thick film of branched polyethylene is wrapped on a polytetrafluoroethylene mandrel and a 2-mil thick film of oriented polypropylene is wrapped over the polyethylene. The composite is heated to bring the interface to a temperature of 330° F. where it is held for about 3 minutes. Quenching at a temperature below 100° F. permits removal of the laminate. The laminate is characterized by high structural strength, satisfactory heat sealability and thermoformability making it useful as a vacuum pack material.

What is claimed is:

1. A process for bonding a thermoplastic material to a second material adhereable to the thermoplastic material when the thermoplastic material is in a softened condition which comprises placing at least one layer of said thermoplastic material over the curved surface of a substantially cylindrical mandrel; placing the thus covered mandrel within a cylinder of said second material, said second material being in contact with said thermoplastic material and maintained in a substantially non-deformable condition; heating said materials in a manner to cause said thermoplastic material to soften and to cause the mandrel to expand a greater amount than said second material; maintaining such conditions for a time sufficient for said thermoplastic material to adhere to said second material; and cooling the materials whereby a cylinder of said second material lined with said thermoplastic material is formed.

2. A process as in claim 1 wherein said thermoplastic material is a copolymer of tetrafluoroethylene and hexafluoropropylene.

3. A process as in claim 1 wherein said second material is polytetrafluoroethylene.

4. A process as in claim 1 wherein said thermoplastic material is a copolymer of terafluoroethylene and hexafluoropropylene and said second material is polytetrafluoroethylene.

5. A process as in claim 1 wherein said thermoplastic material and said second material are both copolymers of tetrafluoroethylene and hexafluoropropylene.

6. A process as in claim 5 wherein said second material is adhere to the inside surface of a metal cylinder prior to receiving said wrapped mandrel.

7. A process as in claim 5 wherein a perforated metal sleeve is placed between said two materials.

8. A process as in claim 5 wherein a cylindrical metal screen is placed between said two materials.

9. A process as in claim 1 wherein a non-adherable metal sleeve is placed over said second material prior to receiving said covered mandrel to maintain said second material in a substantially non-deformable condition.

10. A process for bonding a thermoplastic material to a second material adhereable to the thermoplastic material when the thermoplastic material is in a softened condition which comprises placing at least one layer of said thermoplastic material over the curved surface of a cylinder, at least the outer portion of said curved surface of said cylinder being said second material; placing the thus covered cylinder within a substantially non-deformable sleeve; heating said materials in a manner to cause said thermoplastic material to soften and to cause said cylinder to expand a greater amount than said substantially non-deformable sleeve; maintaining such conditions for a time sufficient for said thermoplastic material to adhere to said second material; and cooling said materials whereby a cylinder of said second material adhereably wrapped with said thermoplastic material is formed.

11. A process as in claim 10 wherein said thermoplastic material is a copolymer of tetrafluoroethylene and hexafluoropropylene.

12. A process as in claim 10 wherein said second material is polytetrafluoroethylene.

13. A process as in claim 10 wherein said thermoplastic material is a copolymer of tetrafluoroethylene and hexafluoropropylene and said second material is polytetrafluoroethylene.

14. A process as in claim 10 wherein said thermoplastic material is branched polyethylene.

15. A process as in claim 14 wherein said second material is polyvinyl fluoride.

16. A process as in claim 14 wherein said second material is oriented polypropylene.

References Cited

UNITED STATES PATENTS

| | | | |
|---|---|---|---|
| 2,027,961 | 1/1936 | Currie | 156—294 X |
| 2,724,672 | 11/1955 | Rubin | 156—294 X |
| 2,773,781 | 12/1956 | Rodman | 117—138.8 |
| 2,774,704 | 12/1956 | Smith | 161—189 |
| 3,184,362 | 5/1965 | Litsky et al. | 156—294 X |

HAROLD ANSHER, *Primary Examiner.*